United States Patent [19]
Mackiw et al.

[11] 3,816,098
[45] June 11, 1974

[54] PRODUCTION OF NICKEL POWDER FROM IMPURE NICKEL COMPOUNDS

[75] Inventors: Vladimir N. Mackiw, Islington, Ontario; Donald R. Weir, Fort Saskatchewan, Alberta; David J. I. Evans, North Edmonton; Dennis G. Maschmeyer, Fort Saskatchewan, Alberta, all of Canada

[73] Assignee: Sherritt Gordon Mines Limited, Toronto, Ontario, Canada

[22] Filed: Dec. 5, 1972

[21] Appl. No.: 312,299

[30] Foreign Application Priority Data
Oct. 20, 1972 Canada.................................. 154623

[52] U.S. Cl...................... 75/.5 A, 75/103, 75/119
[51] Int. Cl............................................. C22b 23/04
[58] Field of Search...................... 75/.5 A, 103, 119

[56] References Cited
UNITED STATES PATENTS

| | | | |
|---|---|---|---|
| 2,734,821 | 2/1956 | Schaufelberger | 75/108 |
| 2,836,485 | 5/1958 | Schaufelberger | 75/.5 |
| 3,156,556 | 11/1964 | Meddings | 75/.5 |
| 3,734,721 | 5/1973 | Edmonton et al. | 75/108 |
| 3,761,250 | 9/1973 | Weir et al. | 75/108 |

*Primary Examiner*—Dewayne Rutledge
*Assistant Examiner*—Arthur J. Steiner

[57] ABSTRACT

According to the invention, substantially pure, particulate elemental nickel is recovered from nickel compounds and particularly from basic nickel carbonate, which are soluble in aqueous ammoniacal ammonium sulphate solution and which contain impurities including particularly zinc, manganese and/or magnesium by first extracting substantially all the nickel content from the impure nickel compound by dissolving it in an aqueous ammoniacal ammonium sulphate solution containing ammonium sulphate in excess of the stoichiometric amount required to react with the nickel to form nickel diammine sulphate. The resulting nickel diammine sulphate solution is separated from undissolved residue and is reacted with hydrogen at elevated temperature and pressure to reduce dissolved nickel to elemental form and to precipitate it in powder form. Nickel-depleted solution, referred to as "reduction end solution," containing zinc, manganese and/or magnesium as well as small amounts of other impurities as dissolved sulphates is recycled to the nickel compound dissolution step and the quantity of such solution recycled is controlled such that the impurities' level in the reduction end solution is maintained at a predetermined level above the level that would result if no solution were recycled but below that level at which zinc, manganese and/or magnesium report in the nickel powder product in sufficient quantity to contaminate the product. The portion of the reduction end solution which is not recycled is bled from the process circuit.

10 Claims, 1 Drawing Figure

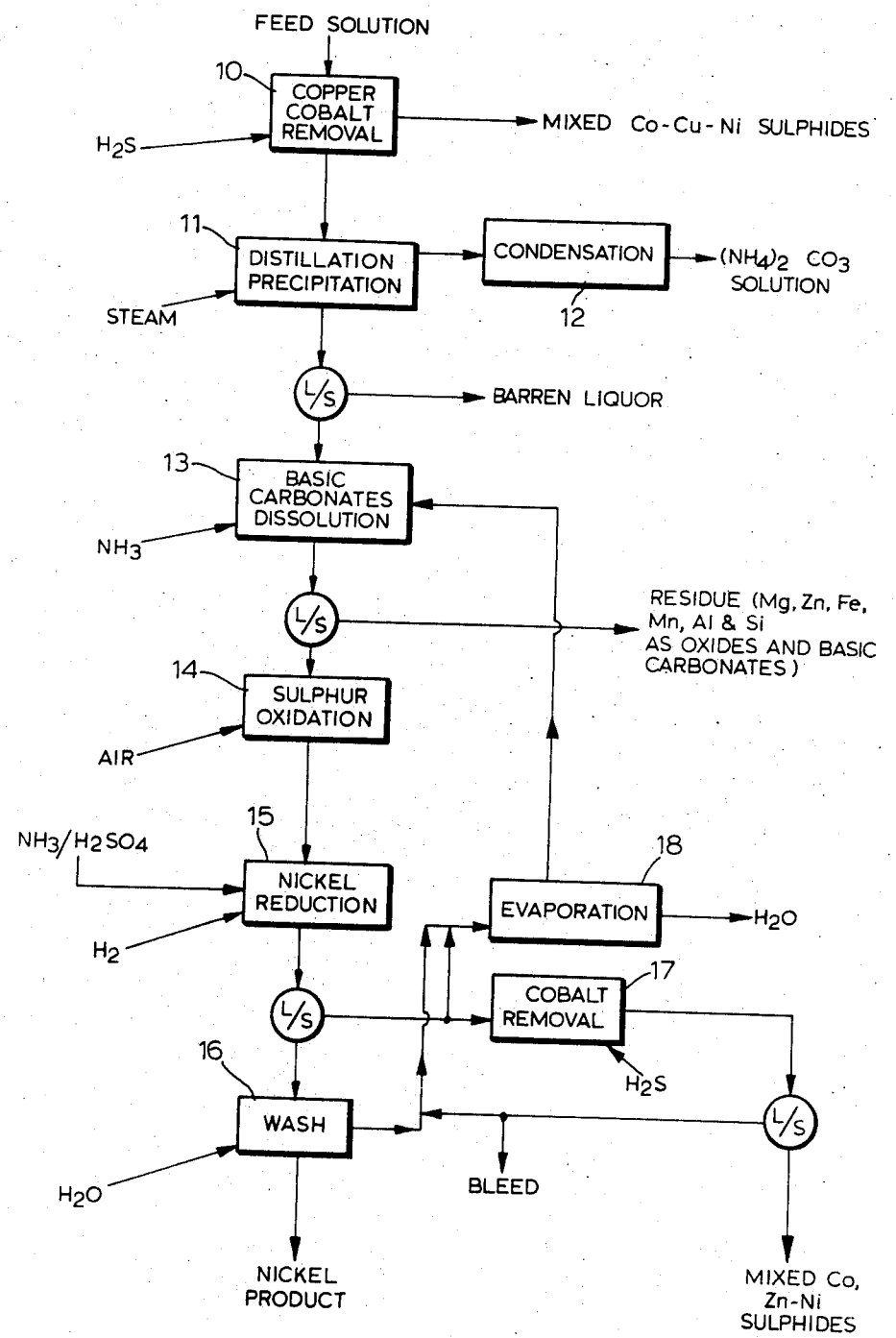

PRODUCTION OF NICKEL POWDER FROM IMPURE NICKEL COMPOUNDS

This invention is concerned with the hydrometallurgical production of powdered metallic nickel, particularly from impure nickel compounds such as carbonates, hydroxides, sulphates, basic carbonates and basic sulphates of nickel. More particularly, it relates to a method for recovering nickel from such compounds when they contain zinc, manganese and magnesium as impurities.

It is known to recover nickel values from nickel bearing oxidic and sulphidic ores by methods involving leaching with ammoniacal ammonium carbonate solution under oxidizing conditions. For example, U.S. Pat. No. 2,400,098 describes a process in which nickeliferous laterite ore is treated by first roasting the ore under reducing conditions to selectively convert nickel values in the material to a form soluble in ammonium carbonate solution and then leaching the reduced material with such solution under oxidizing conditions to dissolve nickel values in the solution. Canadian Pat. No. 811,079 describes a modification of these processes for treating nickel and cobalt bearing laterites whereby the proportion of cobalt recovered is substantially increased by controlling the initial cobalt content of the leaching solutions through selective removal of cobalt from leach liquor recycle streams. It is also known and described in Canadian Pat. No. 530,842, for example, to roast, selectively reduce and then leach nickeliferous sulphide material in ammoniacal ammonium carbonate solution to extract the nickel values. Conventionally, the nickel is recovered from leach liquors produced by these and similar prior art methods simply by boiling the leach solution to drive off ammonia and carbon dioxide and precipitate dissolved nickel as a basic nickel carbonate compound. This precipitate is then heated to convert it to a nickel oxide product which may be marketed as such or which may be further treated by various means to convert it a semi-metallic or metallic nickel product. Although nickel products produced by these methods are suitable for some industrial applications, they are generally contaminated by one or more impurities such as zinc, manganese, magnesium, cobalt, aluminum, iron, silica and copper in amounts which render them unsuitable for a wide range of applications where a high purity nickel product is required.

An alternative procedure for recovering nickel from such ammonium carbonate liquors which has the advantage of enabling the production of nickel in substantially pure metallic powder form is described in Canadian Pat. No. 811,079. Briefly, according to this process, pregnant liquor derived from leaching reduced laterite ore is first heated to drive off ammonia and carbon dioxide to precipitate nickel from solution as basic nickel carbonate. This initial basic nickel carbonate precipitate is separated from the solution and is redissolved in substantially pure ammoniacal ammonium carbonate solution to produce a concentrated nickel ammine carbonate solution. The undissolved solids, which contain manganese, iron, magnesium, silica and other impurities, are separated from the solution and the resulting solids-free solution is heated to re-precipitate at least a part of the dissolved nickel as basic nickel carbonate. The resulting slurry is reacted with a free oxygen bearing gas at an elevated temperature to oxidize sulphur values to sulphate form and the so-treated slurry is then reacted with hydrogen at elevated temperature and pressure to produce substantially pure elemental nickel product. Although this process is suitable for producing a relatively high purity nickel product, it involves a number of time consuming and technically difficult operations. These include the redissolution of the initial basic nickel carbonate precipitate (usually a two-stage dissolution operation is required), slimes separation from the resulting concentrated nickel ammine carbonate solution, recovery of co-precipitated nickel from the slimes, re-precipitation of pure basic nickel carbonate and recovery of ammonia and carbon dioxide during these steps.

Another problem is that some metal impurities, and zinc, manganese and magnesium in particular, are only partly eliminated in the redissolution operation with the result that they end up contaminating the nickel product.

These and other problems of the prior art are largely overcome by the process of the present invention. According to the invention, substantially pure, particulate elemental nickel is recovered from nickel compounds which are soluble in aqueous ammoniacal ammonium sulphate solution and which contain impurities including particularly zinc, manganese and/or magnesium by first extracting substantially all the nickel content from the impure nickel compound by dissolving it in an aqueous ammoniacal ammonium sulphate solution containing ammonium sulphate in excess of the stoichiometric amount required to react with the nickel to form nickel diammine sulphate. The resulting nickel diammine sulphate solution is separated from undissolved residue and is reacted with hydrogen at elevated temperature and pressure to reduce dissolved nickel to elemental form and to precipitate it in powder form. Nickel-depleted solution (referred to herein as "reduction end solution") containing zinc, manganese and/or magnesium as well as small amounts of other impurities as dissolved sulphates is recycled to the nickel compound dissolution step and the quantity of such solution recycled is controlled such that the impurities' level in the reduction end solution is maintained at a predetermined level below that level at which zinc, manganese and/or magnesium report in the nickel powder product in sufficient quantity to contaminate the product. The portion of the reduction end solution which is not recycled is bled from the process circuit.

The process makes use of the discovery that surprisingly high amounts of zinc, manganese and magnesium can be tolerated in an aqueous nickel diammine sulphate reduction solution without contaminating the nickel metal product precipitated therefrom by direct hydrogen reduction. This discovery is utilized in the process of the invention to provide a very simple, economic and yet effective method of avoiding the problem of impurities' contamination in the production of elemental nickel from nickel compounds which are soluble in aqueous ammonium sulphate solution and which contain undesirable impurities, particularly zinc, manganese and/or magnesium in relatively small but contaminating amounts. Specifically, by maintaining the contaminant level in the reduction solution at any predetermined level above the level that would result if no reduction end solution were recycled (i.e. if the process was operated on a "once through" basis) but below the level at which the impurities will contaminate the nickel product, impurities coming into the process circuit with the feed material can be removed by bleeding only a small portion of the total circulating solution. For example, if the zinc level in the reduction end solution is maintained at say 2 g.p.l. then each litre of solution bled from the system will remove 20 times as much zinc as it would if the zinc level was maintained at 0.1 g.p.l. Thus, in the case where, for example, the reduction feed solution contains 50 g.p.l. nickel and 0.05 g.p.l. of zinc is extracted from the feed material for each 50 g.p.l. of nickel extracted, if the level of zinc in the reduction end solution is maintained at say 2 g.p.l., then in order to maintain the zinc at this level, only one fortieth of the total reduction solution will have to be bled. That is, 1 litre of bleed solution will remove the same amount of zinc (2 grams) as is brought into the circuit with 40 litres of fresh feed solution from the dissolution step.

The process of the invention is applicable to the treatment of any nickel compounds which are soluble in aqueous ammonium sulphate solution and which contain zinc, manganese and/or magnesium as impurities. Such compounds could include nickel carbonate, nickel hydroxide, nickel sulphate, basic nickel sulphate and basic nickel carbonate. However, the process is particularly useful for recovering substantially pure nickel from impure basic nickel carbonate precipitated from ammonium carbonate leach liquors such as those derived from leaching reduction roasted laterite ore. As such, the process may be applied directly to the wet, unwashed basic nickel carbonate precipitate to effect recovery of all but a very small portion of the nickel as a high purity elemental nickel powder. Only one stage of dissolution is necessary to achieve well over 99 percent nickel recovery from the basic nickel carbonate precipitate. The dissolution residue is easily separated from the solution and can be conveniently recycled to the leaching operation from which the nickel bearing solution is derived or it can be combined with the sulphide precipitate from the cobalt removal step and passed to further treatment with that material.

The process of the invention is described hereinafter by way of illustration only with reference to the drawing which is a schematic flow sheet illustrating the use of the invention as part of an overall process for recovering nickel from an impure nickel bearing aqueous ammonium carbonate leach liquor.

The process illustrated is independent of the source or manner of preparation of the impure nickel bearing ammonium carbonate liquor from which the nickel is to be recovered. However, in practice, it normally will be applied to treatment of liquors derived from leaching reduction roasted lateritic ores by methods such as those described and claimed in U.S. Pat. No. 900,179 for example. Such leach solutions usually contain, in addition to 5–20 g.p.l. of dissolved nickel, impurities such as cobalt, iron, silica, sulphur and copper, as well as zinc, manganese and magnesium. Such a leach liquor preferably is first treated in cobalt-copper removal step 10 to remove substantially all copper therefrom as well as sufficient cobalt to increase the nickel to cobalt ratio to between about 200:1 and 1,200:1. This may be accomplished by the addition of finely divided nickel sulphides or mixed nickel-cobalt sulphides or, more preferably, by reacting the solution with a sulphidizing agent such as $H_2S$, $(NH_4)_2S$ or $NaHS$. In any case, it is preferred that this removal operation be conducted so as to precipitate only sufficient cobalt to produce in the liquor nickel to cobalt molar ratio up to about 1,200:1. As long as the operation is conducted in this way, coprecipitation of nickel with cobalt is minimized and the cobalt is recovered along with the copper as a high grade mixed cobalt-copper-nickel sulphide.

The product liquor from cobalt and copper removal operation 10 therefore is an ammoniacal nickel ammonium carbonate solution containing nickel and some residual cobalt as well as the other impurities previously mentioned. This liquor is next treated in distillation-precipitation step 11 to remove ammonia and carbon dioxide to precipitate substantially all the dissolved nickel and any remaining cobalt as basic carbonates. The distilled ammonia and carbon dioxide are recovered in condensation step 12 as ammonium carbonate solution which normally will be re-used in the leaching operation to produce fresh feed liquor for the process. Part of the sulphur and the bulk of the other impurities in solution precipitate with the basic nickel carbonate. The basic carbonate precipitate is separated from the barren solution by conventional thickening and filtration procedures and the wet filter cake is passed directly to the dissolution step 13. In this operation, the basic carbonate precipitate is dissolved in aqueous ammoniacal ammonium sulphate solution to produce a nickel diammine sulphate solution containing from about 40 to about 70 g.p.l. nickel, preferably about 55 g.p.l. nickel. The basic reaction taking place in this operation is as follows:

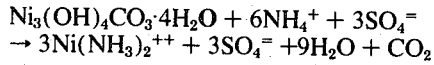

1.

Since the crude basic nickel carbonate precipitate derived from laterite leach solutions will frequently also contain nickel hydroxide and basic nickel sulphates and thiosulphates, the following reactions will also occur:

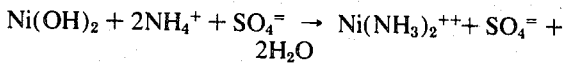

2.

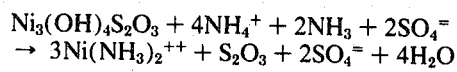

3.

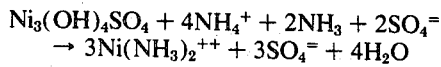

4.

It can be noted from these equations that reactions (3) and (4) require the addition of ammonia as well as ammonium sulphate to convert the nickel to the diammine sulphate form. The amount of ammonia required will, of course, depend on the amount of nickel in the basic sulphate and thiosulphate forms.

A critical requirement in the operation of the dissolution operation 13 is the provision of ammonium sulphate in substantial excess over that required to satisfy the stoichiometric requirements of the foregoing dissolution reactions. Preferably, the ammonium sulphate content of the dissolution solution is adjusted to within the range of from about 450 g.p.l. to about 550 g.p.l. (In this context, the ammonium sulphate level refers to the total free ammonium sulphate plus the sulphate ion and the ammonia tied up as the diammine complex with nickel; thus, the solution must contain from about 100 to about 145 g.p.l. total sulphur in sulphate form.) An ammonium sulphate (or sulphate sulphur) concentration within the specified range is required in order to obtain rapid and substantially complete dissolution of the nickel contained in the wet basic carbonate precipitate. In addition, an ammonium sulphate level within the indicated range is required to prevent hydrolysis of nickel from occurring in the subsequent oxidation step of the process and also to ensure efficient operation of the reduction step as hereinafter described.

The ammonium sulphate requirements for the dissolution step 13 initially are provided from an extraneous source. However, once the overall process is in operation, the required ammonium sulphate is supplied by recycle of concentrated ammonium sulphate solution from the reduction step as is described in more detail hereinafter with reference to the reduction and evaporation operations. The ammonium sulphate loss to the bleed normally is made up by sulphur coming into the process circuit with the basic nickel carbonate feed as is explained in more detail hereinafter. The dissolution operation is conducted to obtain substantially complete, i.e., 98 percent or greater, extraction of the nickel content from the basic carbonate precipitate and to produce a solution containing from about 40 to about 70 g.p.l. of dissolved nickel. Solutions of higher or lower nickel concentration may, of course, be prepared but solutions having nickel concentrations within the indicated range and preferably those containing about 55 g.p.l. dissolved nickel are most suitable for economic and effective operation of the process.

The end slurry from the dissolution step 13 is passed to a liquid-solids separation step wherein the undissolved residue consisting principally of oxides and basic carbonates of Zn, Mg, Fe, Mn, Al and Si is separated from the nickel diammine sulphate solution. It is found that, unlike the residue from the aforementioned prior art process wherein the basic carbonates precipitate is redissolved in aqueous ammoniacal ammonium carbonate solution, the residue remaining after dissolution of the precipitate in ammoniacal ammonium sulphate solution as herein described settles rapidly thereby permitting efficient and economic separation of all but a minor portion of the nickel diammine sulphate solution from the undissolved residue by settling. Thus, it is not necessary to filter the total stream from the redissolution operation to obtain separation of the impurity containing residue from the nickel diammine sulphate solution.

After separation from the redissolution residue, the nickel diammine sulphate solution is treated in oxidation step 14. In this step, the solution is charged into a pressure vessel, such as an autoclave, and is heated to a temperature within the range of about 65°C. to about 260°C., preferably about 175°C. to about 230°C. The solution is contacted with an oxygen containing gas, such as air, oxygen or oxygen enriched air, at an oxygen partial pressure above about 5 p.s.i., preferably between about 20 and 50 p.s.i. This operation is continued until substantially all sulphur values in the solution are oxidized to sulphate form, generally a period of from about 2 to about 20 minutes. The oxidized solution is then passed to the nickel reduction operation 15.

In carrying out the nickel reduction operation of the present invention, the solution is charged into an agitator-equipped pressure vessel, such as an autoclave and is reacted with hydrogen to reduce the nickel in the solution to elemental particulate form. In general, the reduction reaction is carried out within the broad conditions generally known and described in the prior art and particularly in U.S. Pat. Nos. 2,734,821, 2,767,082 and 2,805,139. More specifically, for the present process, the reducing reaction is carried out at a temperature within the range of about 80°C. to about 350°C., preferably from about 150°C. to about 220°C. under a partial pressure of hydrogen within the range of about 100 to about 600 p.s.i., preferably about 450 to 550 p.s.i. The reducing reaction is acid forming; that is, for each mole of nickel reduced from the solution, 1 mole of $H_2SO_4$ is produced. The pH of the reduction end solution is therefore dependent on the amount of acid neutralizing agent, namely ammonia, available in the reaction. If ammonia is present in more than the stoichiometric amount required to satisfy the sulphate ion produced in the reduction reaction, a basic pH will result. If the solution is deficient in ammonia, then an acid pH will result. It is preferred in the present process, to adjust the ammonia content of the reduction feed solution to between about 1.8 and about 3.0 moles of ammonia per mole of nickel in the solution. (In this context "ammonia content" means both free ammonia and ammonia combined with nickel as the diammine complex). Normally, this is done in the dissolution operation but if, for any reason, the feed solution for the reduction step is ammonia deficient, ammonia may be added before or during the reduction step or $H_2SO_4$ may be added where the ammonia content of the feed solution is in excess of 3.0 moles per mole of nickel. Preferably, the ammonia content is adjusted to a level slightly in excess of the stoichiometric requirements of the hydrogen ions produced in the reaction, i.e. to about 2.0–2.1 moles per mole of nickel reduced so that the reduction end solution pH is about 6–8. This, in conjunction with the high level of ammonium sulphate present as previously discussed, permits a high degree of selectivity in the nickel reduction reaction with substantially complete reduction of nickel from solution with little or no co-reduction (and precipitation) of cobalt. This, in turn, means that, if desired, a relatively high level of cobalt can be tolerated in the reduction feed liquor. It also means that a relatively high level of cobalt can be tolerated in the basic carbonate precipitate feed to the process thereby permitting the cobalt removal operation 10 to be conducted under conditions which do not necessarily effect complete cobalt removal but which reduce the amount of nickel co-precipitating with the cobalt to an absolute minimum.

The reduction reaction is continued to reduce and precipitate in powder form substantially all dissolved nickel values in the reduction feed solution. However, the reaction is terminated before dissolved cobalt values in the solution begin to co-precipitate with and contaminate the nickel powder product. The exact end point of the reduction reaction in any specific case will depend on a number of factors, such as the relative nickel and cobalt concentrations in the solution, solution pH, and $(NH_4)_2SO_4$ concentration but, in general, the reduction reaction can be continued with little or no co-precipitation of cobalt until the nickel to cobalt molar ratio in the solution is between about 0.5:1 and about 5:1. Upon completion of a reduction operation, the reduction end solution is discharged. The nickel powder product may be recovered after each such reduction but preferably a plurality of reductions or "densifications" are effected before removal of the nickel powder product from the reduction vessel. That is, reduction end solution is discharged from the reduction vessel after each reduction and fresh feed solution, adjusted as required with respect to free ammonia content, is added to effect a series of reductions, e.g., up to about 50 or more densifications, with the powder product of each reduction functioning as "seed" for each subsequent reduction. Regardless of the number of reductions conducted, the reduction end products consist of nickel powder and reduction end solution containing dissolved impurities, particularly zinc, manganese and magnesium and residual cobalt and nickel values.

Additives may be provided in the reduction feed for purposes of controlling the physical properties of the powder product. For example, a polyacrylic acid compound such as that sold by Rohm & Haas Company under the trade name ACRYSOL may be added if desired to produce irregular shaped nickel powder particles having good compacting properties. However, it is important that where polyacrylic acid is added in order to control the characteristics of the powder particles produced by the present invention, that the quantity added be closely controlled. Preferably, it should be added as a 2.5 wt. percent ammoniated aqueous solution at levels in the range of from about 0.1 to about 1 millilitre per litre of reduction feed solution per densification, more preferably about 0.5 millilitre per litre per densification. If larger quantities of polyacrylic acid are added, it is found that there is a strong tendency for a portion of the zinc values in the reduction feed solution to precipitate with and contaminate the nickel powder product rather than remain in the reduction end solution as is desired.

A portion of the reduction end solution from each reduction is passed to cobalt removal operation 17 and the balance is passed to evaporation step 18. The quantity of solution passed to the cobalt removal operation must be at least sufficient to control the cobalt level in the process circuit within the desired range. In general, it is desirable to control the cobalt level at a relatively low level, i.e., below about 0.5 g.p.l. and preferably below about 0.2 g.p.l. to maximize recovery of nickel in elemental form rather than in mixed nickel-cobalt sulphide form. The solution passed to the cobalt removal operation 17 is reacted with a sulphidizing agent such as $H_2S$, $(NH_4)_2S$ or NaHS to precipitate the residual cobalt values together with the zinc and part of the residual nickel as a mixed cobalt-zinc-nickel sulphate. If the pH of the solution passed to the cobalt removal step 17 is maintained above 7, all of the residual nickel as well as the manganese can also be removed from the solution in this step. The mixed sulphide precipitate is separated from the solution and a portion of the stripped solution is bled out of the system and the balance is passed to the evaporation step 18.

Evaporation step 18 is conducted to evaporate sufficient water from the reduction end solution to maintain the water balance within the process circuit. Water coming into the circuit will include free water associated with the basic nickel carbonate feed, and water formed in the redissolution reactions (1) to (4) as previously noted, as well as that supplied from the wash step 16. Water from these sources in excess of water removed with the bleed must be removed from the system in the evaporation step 18 to maintain the water balance.

The amount of solution removed from the system by the bleed will depend on the quantity of impurities incoming with the basic carbonates precipitate supplied to the dissolution step 13 and the level of impurities in the reduction end solution. As previously noted, an essential and important feature of the present invention is to maintain the dissolved zinc, manganese and/or magnesium contents of the reduction end solution at a predetermined, relatively high level through constant re-circulation of a controlled portion of the reduction end solution to the dissolution step 13. The higher the concentration of zinc, manganese and/or magnesium in the reduction end solution in relation to the amount of these impurities added to the system with each fresh batch of reduction feed solution, the smaller the bleed required to maintain the impurities at the desired constant level. In general, it has been found that up to about 3 g.p.l. zinc and manganese and up to about 5 g.p.l. magnesium can be tolerated in the reduction solution before these impurities begin to contaminate the nickel product in amounts in excess of the ASTM specifications for pure nickel. Thus, for example, for impure basic nickel carbonate precipitate containing zinc, manganese and/or magnesium in the commonly encountered proportions of about 0.1 – 0.2 wt percent, with a 3 g.p.l. level of impurities in the bleed solution, the impurities will be maintained at a constant level by bleeding about one-fifteenth to about one-thirtieth of the total reduction end solution (assuming essentially complete extraction of the impurities and nickel contained in the basic nickel carbonate precipitate).

As previously noted, crude basic nickel carbonate precipitate will normally contain sulphur. In many cases, the incoming basic carbonate precipitate contains sulphur in excess of that required to maintain the sulphur balance within the system if it is operated with the minimum bleed required to maintain the zinc, manganese and/or magnesium at a constant, predetermined level. That is, more sulphur may come into the system than is removed by the minimum bleed required for the maintenance of zinc, manganese or magnesium at a substantially constant level. In practice, the preferred operating procedure in such situation is not to operate with maximum tolerable levels of zinc, manganese and/or magnesium in the reduction feed solution but, rather, to operate at that level which is just sufficient to prevent the build-up of these impurities having regard to the amount of bleed required to maintain the sulphur balance of the system. For example, if a 4 percent bleed is required to maintain the sulphur balance and the zinc, manganese and/or magnesium levels in the basic nickel carbonate are 0.1 wt. percent then the zinc, manganese and/or magnesium levels will be maintained at the minimum (2.5 g.p.l.) level required to prevent their build-up in the system with the 4 percent bleed.

The process of the invention is further illustrated by the following examples:

EXAMPLE 1

A pilot scale test run using the process of the invention was carried out as follows: nickel bearing ammoniacal ammonium carbonate leach solution derived from leaching reduction roasted laterite ore was reacted with ammonium sulphate to remove sufficient cobalt to produce a nickel to cobalt molar ratio in the solution of about 700:1. This solution was then boiled to distill off ammonia and carbon dixoide to effect precipitation of substantially all dissolved nickel as basic nickel carbonate. Approximately 1,500 pounds of wet basic nickel carbonate precipitate was produced in this manner. The wet precipitate analyzed as follows: (weight percent) Ni — 55.0, free $H_2O$ — 56.3, $S_{total}$ — 2.51, Mg — 0.170, Mn — 0.172, Zn — 0.108, Co — 0.072, Fe — 0.032, Al — less than 0.001, $NH_{3total}$ — 0.25 and $CO_2$ — 8.7.

This wet basic nickel carbonate precipitate was dissolved in aqueous ammoniacal ammonium sulphate solution in 27 350 gallon batches utilizing the following operating conditions: target nickel content (g.p.l.) 50.0 ± 0.5, total S-125 ± 5, free $NH_3$ — 35, temperature — 180°F., time — 40 minutes, percent dissolution — at least 99 percent. The make-up solution for dissolving the first batch of basic nickel carbonate precipitate was prepared with approximately 11,000 pounds of commercial grade ammonium sulphate obtained from an extraneous source. To simulate the effect of a commercial operation in which a constant level of impurities is maintained after an initial period of impurities build-up, this solution was spiked with zinc, manganese and magnesium to raise the levels of these impurities in the solution to about 2 g.p.l. for zinc and manganese and 2.5 g.p.l. for magnesium. Subsequent batches of basic nickel carbonate precipitate were dissolved in partially evaporated reduction end solution obtained as hereinafter described with reference to the reduction step of the process.

The solution and the undissolved residue from the redissolution operation were transferred to batch settling tanks where 5 hours retention time was allowed to effect separation of the solids from the solution. The undissolved residue separated from the redissolution solution in this manner had the following average chemical analyses: (weight percent dry weight basis) Ni — 33.2; $S_T$ — 4.71, Mg — 0.788, Mn — 3.25, Zn — 3.50, Co — 0.285, and Fe — 2.25. The weight percent of nickel, sulphur and metal impurities contained in the basic nickel carbonate fed to the process circuit which was removed from the circuit via the settling tank underflow solids was as follows: Ni — 1.16, $S_T$ — 5.55, Mg — 7.3, Mn — 40.0, Zn — 58.3, Co — 9.5 and Fe — 95.5.

The solids free solution from the redissolution operation was contacted with air at 400 p.s.i. and at a temperature between about 410° and 425°F. for about 35 minutes to oxidize substantially all sulphur values in the solution to sulphate form. Composite analysis of the solution from the sulphur oxidation step was: (g.p.l.) Ni — 44.2, $S_T$ — 121.0, Mg — 2.40, Mn — 1.984, Zn — 1.910, Co — 0.180, Fe — 0.0166, Al — less than 0.001.

Nickel was recovered from the oxidized solution by direct reduction with hydrogen using the following procedure: a reduction cycle consisting of an initial nucleation reduction and 49 subsequent "densification" reductions was commenced by pumping 120 pounds (dry weight) of fine (1 micron) pure nickel seed powder obtained from an extraneous source into a high pressure agitator equipped autoclave with 145 imperial gallons of water. Discharge was followed with a 15 minute nitrogen purge, the contents of the autoclave were then heated to 230°F. followed by a water vapour purge. The temperature was raised to 350°F., the nickel powder was allowed to settle and the water was finally discharged.

145 gallons of oxidized feed solution was then charged into the autoclave, heated to 350°F. and hydrogen was applied to give a total pressure of 550 p.s.i.g. During heating, sufficient 200 g.p.l. aqua ammonia was added to maintain the reduction end solution pH at about 7.0 – 8.0. Overall reduction operating conditions were: Number of reductions or "densifications" — 49, Feed volume (imperial gallons) per densification — 145, reduction temperature (°F.) — 350, total pressure (p.s.i.g.) — 550, volume 2.5 percent Acrysol A 3 per reduction (millilitres) — 280* (0.42 mls/1), average reduction end solution pH — 7.5, average aqua ammonia addition 2 imperial gallons per reduction, average reduction time — 20 minutes.

* (Average figure, actual acrysol addition was as follows: 500 millilitres $D_1$ to $D_5$, 400 ml $D_5$ to $D_{10}$. 300 ml $D_{11}$ to $D_{15}$, 200 ml $D_{16}$ to $D_{20}$, 100 ml $D_{21}$ to $D_{25}$, 200 ml $D_{26}$ to $D_{29}$.)

When each reduction was completed, the autoclave agitators were turned off, the nickel powder was allowed to settle and finally the barren end solution was discharged to a flash tank. Upon completion of the cycle of 49 reductions, the autoclave was discharged with agitators running. The nickel powder and end solution were separated in the flash tank. Composite analyses of the reduction end solution was: (g.p.l.) Ni — 0.538, St — 126.8, Mg — 2.46, Mn — 2.06, Zn — 2.04, Co — 0.19, Fe — 0.014, Al — less than 0.001, Cu — 0.0003, $(NH_4)_2SO_4$ — 515. Approximately 2 percent of the total solution entering the process circuit was bled from the circuit (primarily in the form of analytical samples) to maintain levels of zinc, manganese and magnesium in the circulating solution substantially constant while at the same time maintaining the sulphur balance in the system. The reduction end solution was heated to evaporate sufficient water to maintain the water balance in the system while, at the same time, concentrating the ammonium sulphate to about 600 – 650 g.p.l. This solution was then recirculated in the circuit to repulp batches of basic nickel carbonate precipitate as previously described.

The nickel powder product was water washed to remove entrained ammonium sulphate, filtered and dried. Analyses of the final powder product was as follows: (wt percent) Ni — 99.75, Co — 0.052, Cu — 0.0005, Fe — 0.013, Mg — 0.0011, Mn — 0.0016, Zn — 0.0027, Al — less than 0.001, Cr — less than 0.001, Ca — 0.0020, Si — 0.0037, S — 00.20, C — 0.019, $O_2$ — 0.137.

A representative sample of the powder was briquetted and sintered under hydrogen atmosphere at 1,750°F. for 80 minutes. The S, C and $O_2$ analyses of the final product were: S — 0.004, C — 0.006, and $O_2$ — 0.036. It can be noted that the sintering step lowered the sulphur, carbon and oxygen impurities by a factor of 4 or greater resulting in a final nickel analysis of 99.88 percent in the sintered briquettes.

EXAMPLE 2

Another test run was carried out in essentially the same manner as that described in Example 1 except that 50 densifications were effected and an addition of 1,000 millilitres (1.5 mls/litre) of 2.5 percent aqueous Acrysol solution was made for each densification. The zinc content of the final powder product was 0.009 weight percent indicating that the larger Acrysol additions had the undesired affect of increasing zinc contamination in the final product. In most cases a 50 densification cycle is obtainable on commercial size equipment without the need for addition of polyacrylic acid. However, in any case where such additives are used for purposes of controlling powder properties, it is important that no more than about 1.0 millilitres of 2.5 percent aqueous polyacrylic acid solution be added per litre of solution per densification, preferably about 0.5 millilitres per litre densification.

EXAMPLE 3

This example demonstrates the stripping of residual metal values from the reduction end solution. A sample of reduction end solution was reacted with ammonium sulphide in a closed, agitated, nitrogen-blanketed tank. The temperature was kept at 135°F. and the $(NH_4)_2S$ was added in measured quantities at 30 minute intervals. The solution was sampled after each addition. The analysis of the head solution and the results obtained are shown in the following Tables:

TABLE I

Reduction End Solution Analysis Before Stripping With $(NH_4)_2S$

| Ni gpl | Co gpl | Zn gpl | Mn gpl | $S_T$ gpl |
|--------|--------|--------|--------|-----------|
| 1.04   | .200   | 1.350  | 1.578  | 120.4     |

TABLE II

Analytical Data After Each Addition Of $(NH_4)_2S$

| S/TM* Molar Ratio | Ni gpl | Co gpl | Zn gpl | Mn gpl |
|---|---|---|---|---|
| 0.000 | 1.04 | .200 | 1.350 | 1.578 |
| .143  | —    | .202 | 1.350 | 1.574 |
| .286  | .976 | .160 | 1.040 | 1.354 |
| .429  | .908 | .152 | .984  | 1.284 |
| .572  | —    | .142 | .932  | —     |
| .715  | .854 | .088 | .600  | —     |
| .858  | .788 | .042 | .390  | 1.226 |
| 1.001 | .540 | .022 | .134  | .988  |
| 1.144 | .104 | .013 | —     | .722  |
| 1.287 | .007 | .012 | .038  | .374  |
| 1.430 | .001 | .012 | .034  | .044  |

*Total metals

It is to be understood that the process as described with reference to the flow scheme shown in the drawing and as illustrated by the preceding examples 1, 2 and 3 includes a number of optional features which are not essential to the invention in its broader aspects. Specifically, the requirement for sulphur oxidation of the reduction feed solution (step 14) and evaporation of the reduction end solution (step 18) is dictated by the composition of the particular feed material for the specific case described. This feed material, wet basic nickel carbonate precipitated from ammonium carbonate leach solution derived from leaching reduction roasted laterite ore, normally will contain unsaturated sulphur compounds as well as small amounts of sulphide sulphur and it is necessary that these sulphur values be oxidized to sulphate form prior to the reduction step in order to prevent sulphur contamination of the nickel product. However, in the case where the feed material for the process, i.e., the material going into the dissolution step, does not contain sulphur or contains only sulphate sulphur, the oxidation step 14 will not be required.

Basic nickel carbonate precipitate also contains a relatively large quantity of uncombined water and also forms a relatively large amount of water upon reacting with ammonium sulphate in the dissolution step. Where the bleed is not sufficient to remove all this water, it must be removed from the system in some other way in order to maintain the water balance. Thus, the evaporation step 18. Similarly, of course, if the quantity of water coming into the feed is such that the water balance can be maintained with the bleed alone, then, of course, the evaporation step 18 is not required.

Stripping of the bleed solution to remove zinc and residual cobalt and nickel is also optional. Its use or non-use in the process will depend primarily on economic considerations applicable to the specific plant installation.

What we claim as new and desire to protect by Letters Patent of the United States is:

1. A process for recovering substantially pure nickel in powder form from nickel compounds which are capable of being dissolved in aqueous ammoniacal ammonium sulphate solution and which contain undesirable impurities including at least one of zinc, manganese and magnesium which comprises the steps of extracting substantially all nickel from said nickel compound by dissolving said compound in aqueous ammoniacal ammonium sulphate solution containing an excess of ammonium sulphate over the stoichiometric amount required to react with the nickel content of said compound to form nickel diammine sulphate; separating undissolved solids from the resulting nickel diammine sulphate solution; reacting the resulting solids-free nickel diammine sulphate solution with hydrogen at elevated temperature and pressure to produce an elemental nickel powder product and reduction end solution containing said undesirable impurities as dissolved sulphates; separating said reduction end solution from said nickel powder product; recycling a sufficient amount of said solution to said nickel compound dissolution step to maintain the concentration of said impurities in said reduction end solution at a predetermined level above that which would result if no reduction end solution were recycled but below that at which any one or more of said impurities begins to report in said nickel powder product in sufficient quantity to contaminate said product, then bleeding the un-recycled portion of the reduction end solution from the process circuit.

2. The process according to claim 1 wherein the material treated is wet basic nickel carbonate precipitated from an ammoniacal ammonium carbonate leach liquor and the dissolution step is conducted to produce a nickel diammine sulphate solution containing from about 40 to about 70 g.p.l. of dissolved nickel and from about 100 to about 145 g.p.l. sulphur in sulphate form.

3. The process according to claim 1 wherein the ammonia content of the solution reacted with hydrogen is adjusted to provide between 1.8 and 3.0 moles of ammonia per mole of elemental nickel produced.

4. The process according to claim 1 wherein the reduction operation is conducted on a batch basis with successive batches of fresh feed solution being reacted with hydrogen in a closed reaction vessel and with the nickel powder product of each such reduction being left in the reaction vessel for each subsequent reduction until a plurality of such reductions have been completed.

5. The process according to claim 4 wherein from about 0.1 to about 1 millilitre per litre of 2.5 percent aqueous polyacrylic acid solution is added to each batch of solution treated in said reduction operation.

6. The process according to claim 2 wherein the ammonium sulphate concentration of the ammoniacal ammonium sulphate solution used in the nickel dissolution step is adjusted to within the range of about 500–550 g.p.l.

7. The process according to claim 2 wherein the water balance within the process circuit is maintained by evaporating from the recycled reduction end solution any excess water not removed from the circuit with the bleed.

8. The process according to claim 1 wherein the nickel compound also contains cobalt which is dissolved along with the nickel and wherein the level of dissolved cobalt in the process circuit is maintained substantially constant by stripping cobalt from a sufficient portion of the reduction end solution to remove from the process circuit a quantity of cobalt equivalent to that coming into the circuit with the nickel.

9. The process according to claim 2 wherein said basic nickel carbonate contains sulphur and said nickel diammine solution from said dissolution step is reacted with a free oxygen bearing oxidizing gas at a partial pressure of oxygen above about 5 p.s.i. at a temperature within the range of about 200°F. to about 500°F. to convert substantially all contained sulphur values to the sulphate form.

10. The process according to claim 9 wherein the quantity of reduction end solution bled from the process circuit and the level of zinc, manganese and/or magnesium in said solution are controlled to maintain the sulphur balance in the process circuit whilst simultaneously maintaining the balance of said impurities in the circuit.

* * * * *